(12) United States Patent
Vaughan et al.

(10) Patent No.: US 8,504,938 B2
(45) Date of Patent: Aug. 6, 2013

(54) GRAPHICAL USER INTERFACE COMPONENT THAT INCLUDES VISUAL CONTROLS FOR EXPANDING AND COLLAPSING INFORMATION SHOWN IN A WINDOW

(75) Inventors: Misha Vaughan, Fremont, CA (US); Tony Chen, Duluth, GA (US)

(73) Assignee: Oracle International Corporation, Redwood Shores, CA (US)

( * ) Notice: Subject to any disclaimer, the term of this patent is extended or adjusted under 35 U.S.C. 154(b) by 706 days.

(21) Appl. No.: 12/174,489

(22) Filed: Jul. 16, 2008

(65) Prior Publication Data

US 2009/0125835 A1 May 14, 2009

Related U.S. Application Data

(60) Provisional application No. 60/986,987, filed on Nov. 9, 2007.

(51) Int. Cl.
*G06F 3/048* (2013.01)

(52) U.S. Cl.
USPC ........................................................ 715/781

(58) Field of Classification Search
USPC ................. 715/781, 783, 788, 802, 808, 790, 715/792
See application file for complete search history.

(56) References Cited

U.S. PATENT DOCUMENTS

| | | | | |
|---|---|---|---|---|
| 5,812,135 A * | 9/1998 | Kotchey | .......................... | 715/853 |
| 5,874,958 A * | 2/1999 | Ludolph | .......................... | 715/781 |
| 5,917,492 A * | 6/1999 | Bereiter et al. | ............... | 715/854 |
| 5,986,657 A * | 11/1999 | Berteig et al. | ................. | 715/792 |
| 6,055,515 A * | 4/2000 | Consentino et al. | ......... | 705/27.1 |
| 6,115,044 A * | 9/2000 | Alimpich et al. | ............. | 715/855 |
| 6,147,685 A * | 11/2000 | Bliss et al. | ...................... | 715/769 |
| 6,271,846 B1 * | 8/2001 | Martinez et al. | .............. | 715/854 |
| 6,348,935 B1 * | 2/2002 | Malacinski et al. | .......... | 715/853 |
| 6,380,957 B1 * | 4/2002 | Banning | ........................ | 715/828 |
| 6,462,762 B1 * | 10/2002 | Ku et al. | ........................ | 715/853 |
| 6,484,190 B1 * | 11/2002 | Cordes et al. | ................. | 715/207 |
| 6,879,988 B2 * | 4/2005 | Basin et al. | ........................... | 1/1 |
| 6,886,134 B1 * | 4/2005 | Cason | ........................... | 715/760 |
| 7,242,413 B2 * | 7/2007 | Chu et al. | ...................... | 345/619 |
| 7,353,464 B1 * | 4/2008 | Kundu et al. | .................. | 715/853 |
| 7,437,686 B1 * | 10/2008 | Bernstein et al. | ............. | 715/853 |
| 7,610,564 B1 * | 10/2009 | Pfohe et al. | .................... | 715/854 |
| 7,669,147 B1 * | 2/2010 | Molander et al. | ............. | 715/854 |
| 7,984,388 B2 * | 7/2011 | Dieberger et al. | ............ | 715/853 |
| 2003/0033267 A1 * | 2/2003 | Bleizeffer et al. | ................ | 707/1 |
| 2003/0081013 A1 * | 5/2003 | Allen et al. | .................... | 345/853 |
| 2003/0105771 A1 * | 6/2003 | Tiefenbrun et al. | ....... | 707/103 R |
| 2004/0125124 A1 * | 7/2004 | Kim et al. | ...................... | 345/716 |
| 2004/0189707 A1 * | 9/2004 | Moore et al. | .................. | 345/777 |
| 2004/0199539 A1 * | 10/2004 | Richardson et al. | .......... | 707/102 |
| 2004/0239683 A1 * | 12/2004 | Chu et al. | ...................... | 345/619 |
| 2006/0005124 A1 * | 1/2006 | Speicher | ........................ | 715/514 |
| 2006/0047673 A1 * | 3/2006 | Molander et al. | ............. | 707/101 |
| 2006/0085435 A1 * | 4/2006 | Farn | .............................. | 707/100 |
| 2006/0085790 A1 * | 4/2006 | Hintermeister et al. | ...... | 718/100 |
| 2006/0129569 A1 * | 6/2006 | Dieberger et al. | ............ | 707/100 |

(Continued)

*Primary Examiner* — Tuyetlien Tran
*Assistant Examiner* — Jessica Chuang
(74) *Attorney, Agent, or Firm* — Silicon Valley Patent Group LLP; Omkar Suryadevara

(57) ABSTRACT

A graphical user interface component includes visual controls for expanding and collapsing a subset of content inside of a desktop widget, an application side pane, or other software.

20 Claims, 11 Drawing Sheets

U.S. PATENT DOCUMENTS

| | | | |
|---|---|---|---|
| 2006/0155746 A1* | 7/2006 | Abrams et al. | 707/102 |
| 2006/0288311 A1* | 12/2006 | Heer et al. | 715/853 |
| 2008/0016474 A1* | 1/2008 | Guido et al. | 715/854 |
| 2008/0059912 A1* | 3/2008 | Scherpa et al. | 715/853 |
| 2009/0063517 A1* | 3/2009 | Wright et al. | 707/100 |
| 2009/0144665 A1* | 6/2009 | Bernstein et al. | 715/853 |

* cited by examiner

GRAPHICAL USER INTERFACE COMPONENT THAT INCLUDES VISUAL CONTROLS FOR EXPANDING AND COLLAPSING INFORMATION SHOWN IN A WINDOW

CROSS-REFERENCE TO RELATED APPLICATION

This application claims the benefit of U.S. provisional patent application 60/986,987, filed, Nov. 9, 2007, which is incorporated by reference along with all other references cited in this application.

BACKGROUND OF THE INVENTION

This invention relates to the field of computer user interfaces and more specifically, to a graphical computer user interface component with visual controls for improving the visualization of information.

Computers and software are important tools in modern society. Computer and software technology has revolutionized the devices people interact with on a daily basis. Besides computers, some examples of everyday devices using software include telephones including mobile phones and smartphones, personal digital assistants (PDAs), media players (e.g., MP3 players, video players, photo viewers, digital video disc (DVD) players), global positioning system (GPS) devices, radio devices, cable or satellite TV service boxes, telephones, household appliances, and many others. Many fields of human activity now use some form of software.

Some types of software include system software, programming software, and application software. System software helps run the computer hardware and computer system. System software includes operating systems, device drivers, diagnostic tools, servers, windowing systems, utilities and more. Programming software generally provides tools to assist a programmer in writing computer programs and software using different programming languages in a more convenient way. Application software allows end users to accomplish one or more specific tasks. Some applications include industrial automation, business software, educational software, medical software, databases, and computer games.

As software evolves, it is desirable to have software that is easier for people to use and interact with. One innovation that has helped spread the use of computer technology is the graphical user interface. Graphical user interfaces, also known as GUIs, make it easier for people to work with and use computer software. GUIs provide a visual interface or front-end to a software program or operating system. GUIs provide visual elements which simplify the way the user interacts with the computer.

Despite the widespread success of computers and software, there continues to be a need for improved software and graphical user interfaces. It is especially desirable to have interfaces that are easy to use, allow users to visualize their data better or faster, or allow users to visualize their data in different ways.

Therefore, there is a need for improved graphical user interfaces, especially an improved visual control for a user to expand and collapse the amount of information shown on the screen as the user desires.

BRIEF SUMMARY OF THE INVENTION

A graphical user interface component that includes visual controls for expanding and collapsing a subset of content inside of a desktop widget, an application side pane, or other software. A user interface of the invention maintains the user in the context of their current work. Specifically, the interface design provides significantly more detailed information, on an as-needed basis, in the widget and side pane. The user uses a visual control, which expands to fill the available widget or side pane real estate with the needed detail. Using the same control, a user can easily return the widget or side pane to its prior state of summary information (i.e., higher level than the detail).

The interface design has a number of benefits. First, the interface provides the user with easy access to more detailed information, rather than simply limiting the amount of available information. Second, the interface provides this detail without requiring any more screen real estate, in contrast to the widgets and gadgets that pop-up a secondary window. Third, this design does not require linking off to another website for more detailed content.

This interface will provide an improved consumer-level user experience. The interface may be used in many different products including, for example, the Oracle Applications Unlimited and Oracle Fusion Applications product lines from Oracle Corporation of Redwood Shores, Calif. In a specific implementation, customers of software with the user interface features of the invention will be able to code and deploy their own widgets or side pane content using a provided framework, thus leveraging the feature for their own end users.

In a specific embodiment, a method includes: displaying a first application window on an electronic screen, displaying within the first application window, an expanded header section including at least first and second collapsed subheader sections, where the first collapsed subheader section includes a first banner.

If the collapsed first subheader section has one or more items, the method further includes displaying a visual indicator in the first banner.

When a user selects the collapsed first subheader section using a pointing device, displaying within the first application window an expanded first subheader section in a first region having a first area size for showing items of the first subheader section, and the collapsed second subheader section, where the expanded first subheader section comprises items associated with the first subheader section, and a second banner for the expanded first subheader section comprises a user-selectable object.

If the expanded first subheader section has one or more items, the method further includes displaying the visual indicator in the second banner.

When the user selects the user-selectable object using the pointing device, the method further includes displaying the items associated with the first subheader section in a second region of the first application window having a second area size, larger than the first area size, where the collapsed second subheader section is not displayed in the first application window.

More items may be viewable with the second region of the first application window than using the first region.

The method may further include where after displaying the items associated with the first subheader section in the second region of the first application window, when the user selects the user-selectable object using the pointing device, displaying the expanded first subheader section in the first region of the first application window and the collapsed second subheader section, where the expanded first subheader section includes items associated with the first subheader section, and the second banner for the expanded first subheader section includes the user-selectable object.

When displaying the expanded first subheader section, the items may be displayed in a region of the first application window beneath the first banner. A search bar may be displayed in the first application window before and after the user selects the user-selectable object. The visual indicator may be a counter for indicating a number of items associated with the first subheader section. The user-selectable object may be an icon.

When displaying the items associated with the first subheader section in the second region of the first application window, the items may be demarcated by an indentation.

In an embodiment, the method further includes the step of displaying the first application window within a second application window.

When displaying the first application window within a second application window, the first application window may be displayed in a side pane.

When displaying the first application window within the second application window, the first application window may abut a workspace of the second application window.

In an embodiment, the method further includes the step of displaying the first application window within a second application window, where the first application window abuts a workspace of the second application window.

The second application window may include an application selected from the group consisting of a word processing application, a spreadsheet application, a database application, a diagramming application, a calendaring application, an e-mail application, and a presentation application.

In another embodiment, a method includes: displaying an application window, displaying within the application window at least one tab, the at least one tab including at least a collapsed first header section, where the first header section comprises a header banner.

When the user selects the collapsed first header section, displaying an expanded first header section in the application window, where the expanded first header section includes at least a collapsed subheader section.

When the user selects the collapsed subheader section, the method may further include displaying a partially expanded subheader section having a first area size in the application window, where the partially expanded subheader section includes a first user-selectable object and items associated with the subheader section.

When the user selects the first user-selectable object, the method may further include displaying a fully expanded subheader section having a second area size, larger than the first area size, in the application window, without opening a separate graphical window, where the fully expanded subheader section includes a second user-selectable object and items associated with the subheader section. The at least one tab and header banner are omitted in the application window.

When displaying within the application window at least one tab, the at least one tab including at least a collapsed first header section, the method may further include displaying within the application window a collapsed second header section. When displaying a fully expanded subheader section having a second area size, larger than the first area size, in the application window, without opening a separate graphical window, the method may further include omitting the collapsed second header section. More items may be viewable with the fully expanded subheader section than using the partially expanded subheader section.

When after displaying a fully expanded subheader section having a second area size, larger than the first area size, in the application window, without opening a separate graphical window, when the user selects the second user-selectable object, the method may further include displaying the at least one tab, and the partially expanded subheader section having the first area size in the application window, where the partially expanded subheader section includes the first user-selectable object and items associated with the subheader section.

The header banner may further include a counter indicating a number of items associated with the first header section. The subheader section may further include a subheader banner where the subheader banner includes a subcounter indicating a number of items associated with the subheader section.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
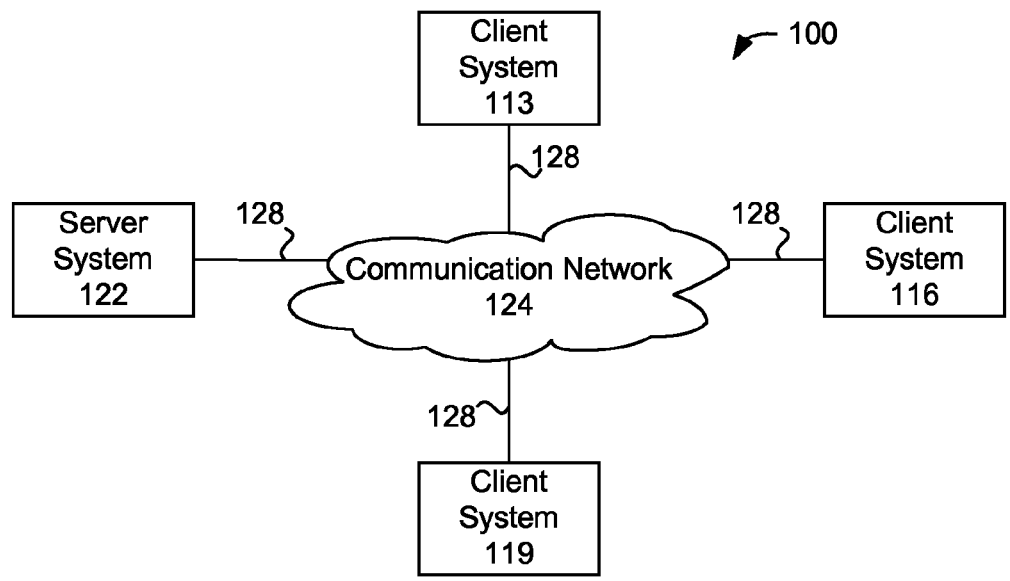
FIG. 1 shows a block diagram of a client-server system and network in which an embodiment of the invention may be implemented.

FIG. 1 is a simplified block diagram of a distributed computer network 100 incorporating an embodiment of software of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
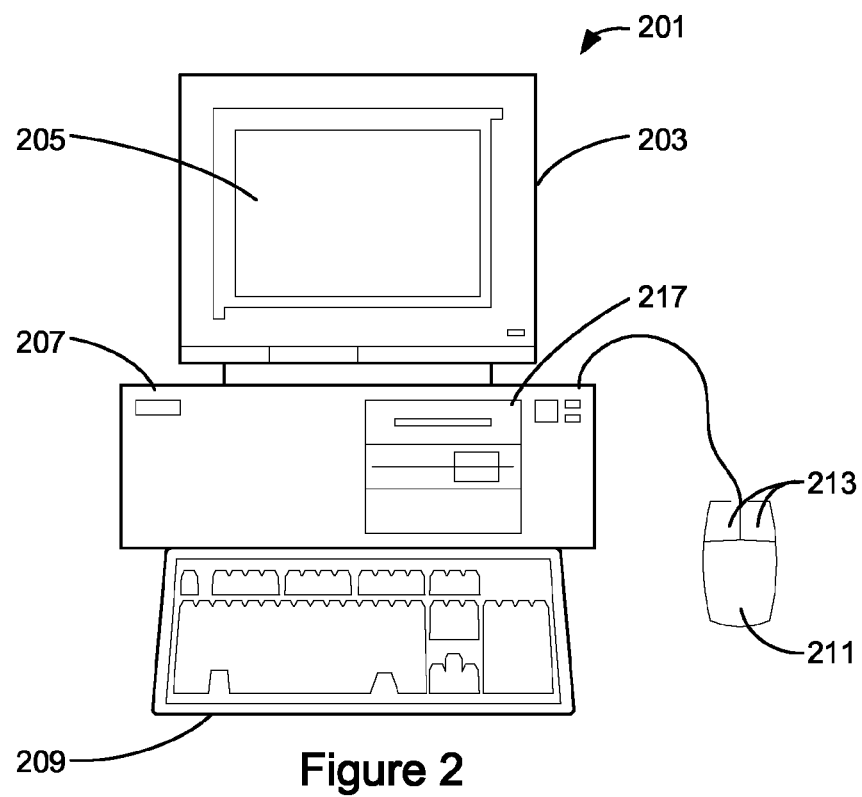
FIG. 2 shows a more detailed diagram of an exemplary client or computer which may be used in an implementation of the invention.

FIG. 2 shows an exemplary system incorporating software of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
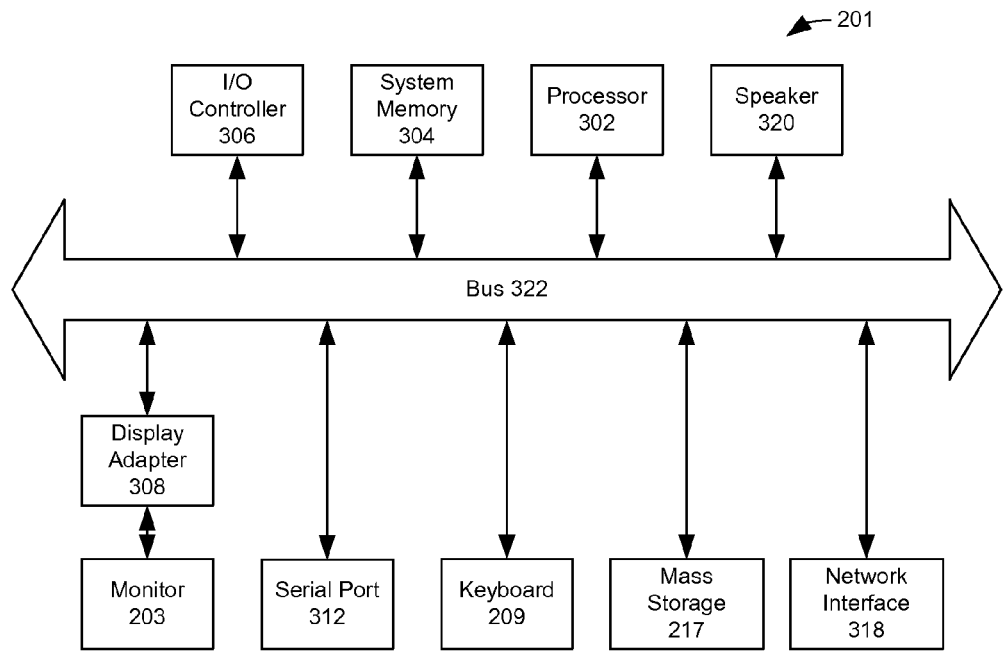
FIG. 3 shows a system block diagram of a client computer system used to provide a user interface according to the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 3 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Figure 4:
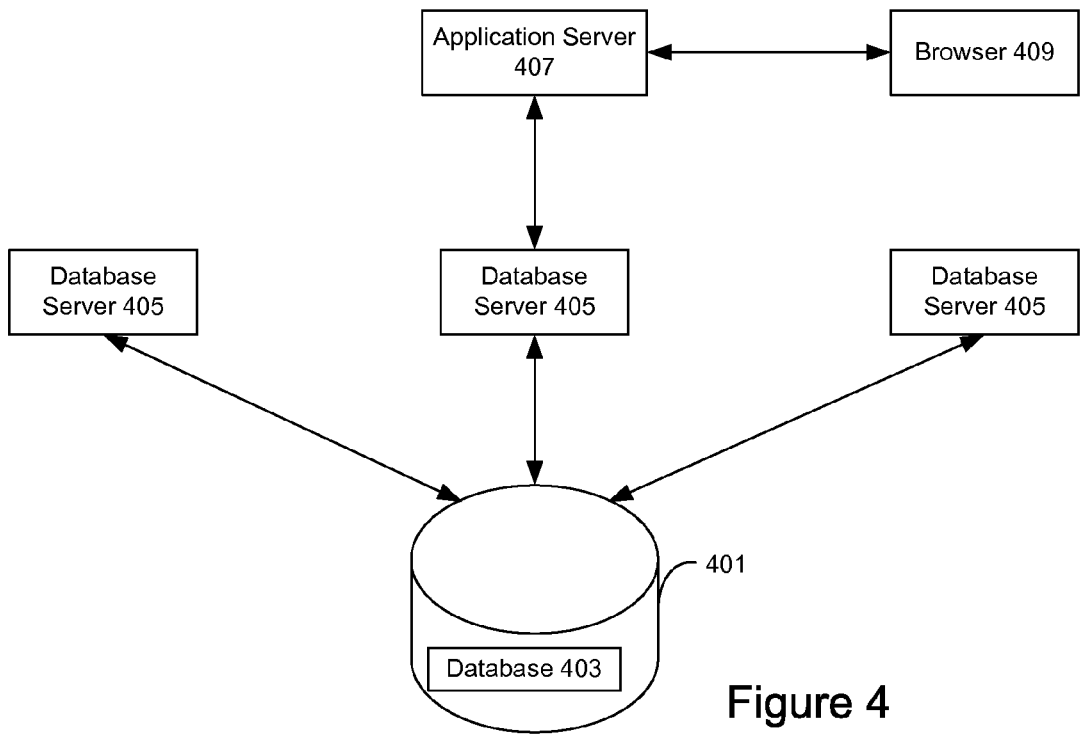
FIG. 4 shows a data source or data service in the form of a database system.

FIG. 4 shows a data source or data service in the form of a database system, with which software of the invention may be used. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

There is a computer software application know as a widget. A widget (or control) is an interface element that a computer user interacts with, such as a window or a text box. Widgets are sometimes qualified as virtual to distinguish them from their physical counterparts such as virtual buttons that can be clicked with a mouse cursor. This is in contrast to physical buttons that can be pressed with a finger. Widgets are often packaged together in widget toolkits. Programmers may use widgets to build graphical user interfaces (GUIs).

Some desktop widget solutions (e.g., Yahoo Widgets and Google Gadgets) as well as Application Side Pane solutions (e.g., Microsoft Office Side Pane) have a very limited amount of screen real estate. They deal with the lack of screen space by (a) simply limiting the amount of information displayed, (b) providing a link to a website with more detailed information, or (c) using hide and show controls to pop-up a window to show more detailed content. Other examples of how this screen space problem has been dealt with include the "minimize/maximize" control that is currently part of the Microsoft Windows line of operating systems (e.g., Windows XP). This control provides users with a way of displaying more or less information on their screen at a time.

Figure 5:
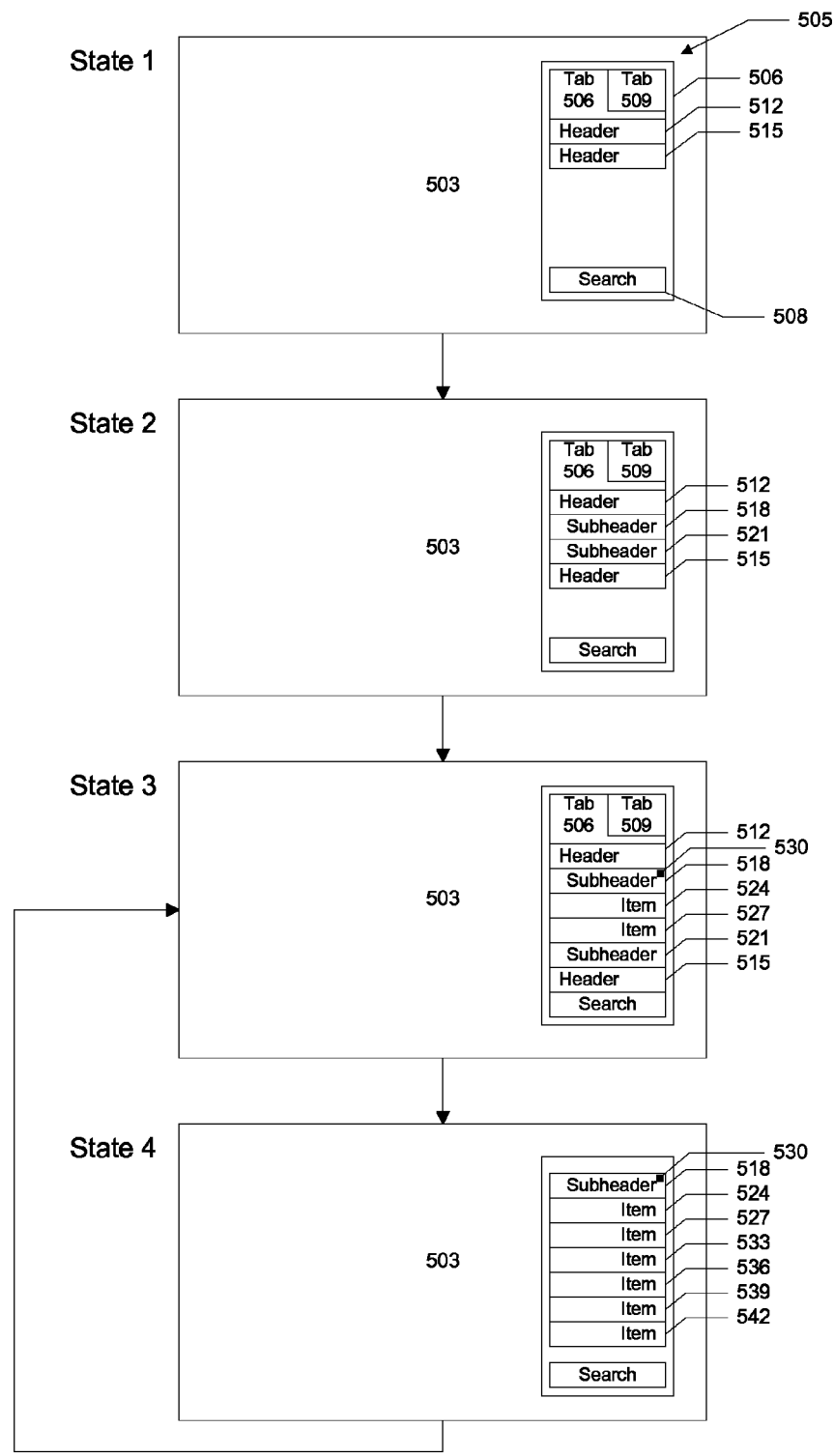
FIG. 5 shows an example of various system states of a first implementation of the invention as a desktop widget application.

FIG. 5 shows an example of various system states of a first implementation of the invention. In a state 1, a desktop widget application 505 is shown in a window 506 on a computer screen 503. The desktop widget application includes a search tool 508, various organization levels, and labels. For example, the desktop widget application shown includes a tab 506 and a tab 509. Tab 506 includes headers 512 and 515.

In a state 2, a user has selected header 512. Header 515 drops down in the window so that subheaders 518 and 521 are shown.

In a state 3, the user has selected subheader 518. Subheader 521 and header 515 drop down in the window so that items 524 and 527 which are associated with subheader 518 are shown. A user-selectable object 530 is also shown with subheader 518.

In a state 4, the user has clicked on the user-selectable object. The application window now displays additional items such as items 533, 536, 539, and 542 that are associated with subheader 518. The tabs and headers are not shown to ensure efficient use of the area provided by the window. When the user clicks on the user-selectable object again, the system returns to state 3.

In a specific implementation, the user may jump from state 2 to state 4 and back to state 2 without having to encounter state 3. For example, in state 2, the subheader may include a user-selectable object that toggles the display between state 2 and state 4.

In a specific implementation, the area of the window remains the same or constant throughout the various state changes. This helps to prevent, for example, the desktop widget application window from covering other application windows that the user may have open. Thus, the user does not have to resize or move their other application windows.

However, in another implementation, the area of desktop widget application window may change from state to state. For example, in state 1 the window may shrink such that the search tool is adjacent to header 515. The window may then continue to expand as the user clicks on the various headers and subheaders to see more information. Thus, the area of the window may expand to be larger in state 2 than in state 1. Likewise, the area of the window in state 3 may be larger than in state 2 and the area of the window in state 4 may be larger than in state 3.

One benefit to this implementation is that empty space within the desktop widget application window is minimized. This leaves more room for other applications to be displayed on the screen.

There may be any number of organization levels. For example, in a specific implementation there are three organizational levels. As shown in FIG. 5, the first organization level has been implemented as tabs, i.e., tabs 506 and 509. The second organizational level has been implemented as headers, i.e., headers 512 and 515. The third organizational level has been implemented as subheaders, i.e., subheaders 518 and 521.

However, in other implementations there may be less than three organizational levels such as one or two organizational levels. Another implementation may have more than three organizational levels such as four, five, six, or more than six organizational levels.

Organizational levels help users to categorize and organize information. It enables users, for example, to quickly find the information that they want. Having many organizational levels may be beneficial in applications where, for example, the data includes a deep hierarchy. However, other applications may have less organizational levels where, for example, the data includes a shallow hierarchy.

Furthermore, there may be any number of categories or divisions within an organizational level. For example, an implementation may have any number of tabs, headers, and subheaders. There may be one, two, three, four, five, six, or more than six tabs. A specific implementation may not include any tabs where, for example, there is no need for first level categories. There may be one, two, three, four, five, six, or more than six headers. A specific implementation may not include any headers where, for example, there is no need for second level categories. There may be one, two, three, four, five, six, or more than six subheaders. A specific implementation may not include any subheaders where, for example, there is no need for third level categories.

The categories or divisions further help to provide a structure for users to efficiently organize, find, and act on information. An implementation may have more or less divisions depending on the application as the type of information encountered by users is incredibly varied. For example, a user may be responsible for a number of different tasks and issues, such as keeping track of notifications, approvals, denials, due dates, and more. Having categories, such as a category for approvals, helps to prevent a user from confusing something that has been denied from something that has been approved.

In a specific implementation, the application remembers the state where the user last was when the user exited the application. For example, if the user was in state 4 when they exited the application then the next time the user accesses the application, the application will open to state 4. This may be implemented by storing state information at the user's client device using, for example, a cookie. In another implementation, the state information may be centrally stored such as on a server.

This is advantageous where, for example, the user is always interested in seeing items for a particular subheader where, for example, the items are associated with issues for a critical product. Thus, each time the user accesses the system, the user does not have to click through the various states to get to the state they were at when they last left the application.

Figure 6:
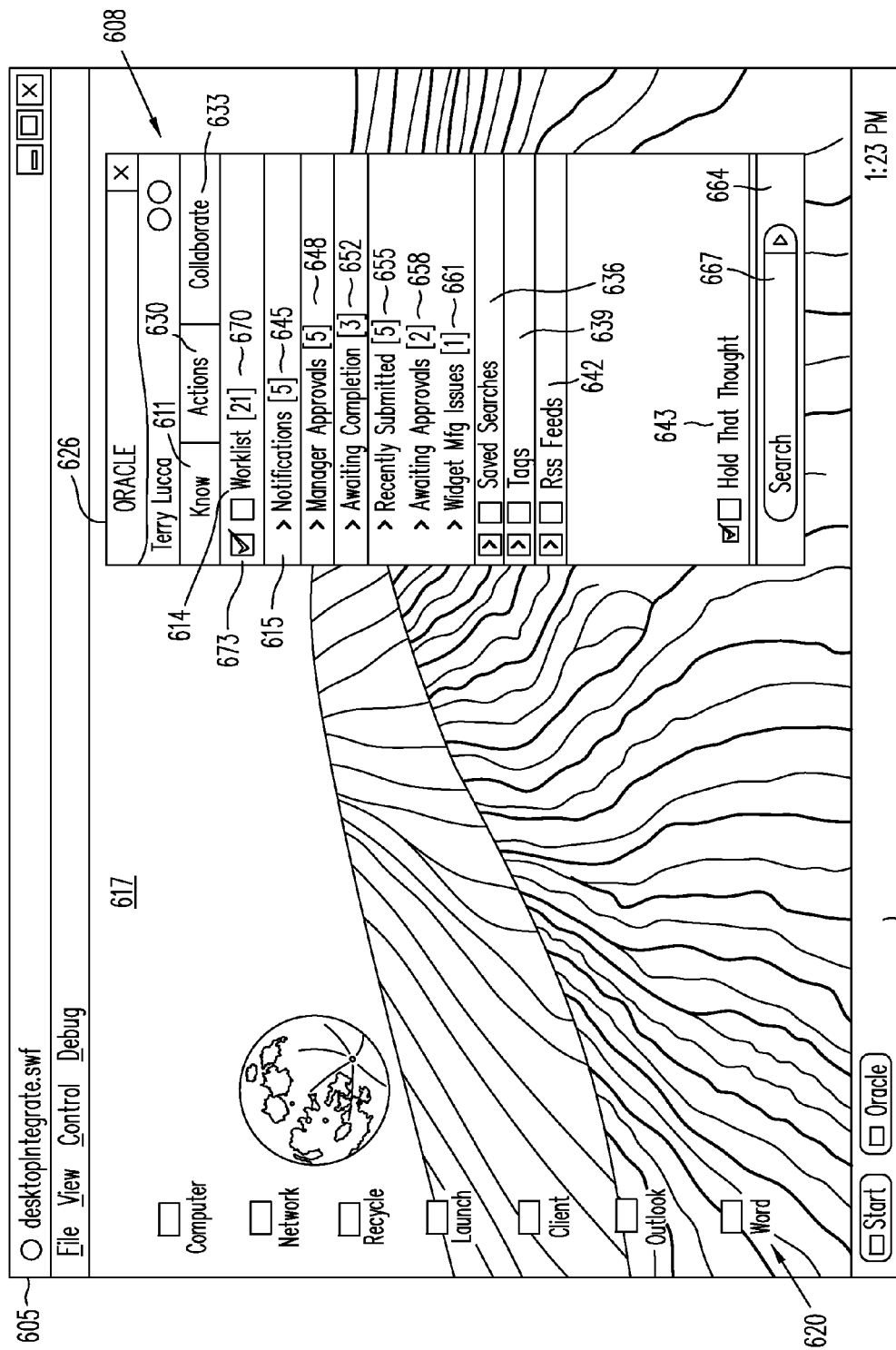
FIG. 6 shows a computer screen displaying a desktop widget application with a "Know" tab selected and a "Worklist" header expanded within this tab.

FIG. 6 shows a computer screen 605 displaying a specific implementation of a desktop widget application 608 with a "Know" tab 611 selected and a "Worklist" header 614 expanded within this tab in an expanded header section 615. Along with the desktop widget, the computer screen shows a desktop 617 of an operating system's (e.g., Windows XP) graphical user interface. The graphical user interface has wallpaper for a screen background, icons 620, and taskbar 623 with notification area. The desktop widget application is provided in a window 626 on the desktop. This window may be moved to any position on the desktop as the user desires.

As an example, the invention is described with respect to a desktop widget application. Examples of widgets includes Oracle's desktop widget, Yahoo!'s widget, Google Gadgets, and Dashboard widgets for Apple's Mac OS X or Desktop Gadgets for Windows Vista.

However, as one of skill in the art will appreciate, the features and aspects of the invention are applicable to other types of software applications, especially those providing a graphical user interface. Some examples of software applications where the invention may be used include: operating systems, e-mail software, word processing software, spreadsheet software, database software, presentation software, photo editing software, audio editing software, video editing software, media playing software, music generating software, instant messenger software, peer-to-peer (P2P) file transfer software, virus checking software, adware removal software, spyware removal software, Trojan removal software, project management software, programming tools software, and many others.

The figure shows a computer screen which is typical of a desktop or laptop computer. However, the invention may also be used for applications on other types of devices with displays. Some examples of devices include: mobile phones including smartphones (e.g., iPhone from Apple Corporation), telephones, wireless e-mail devices (e.g., BlackBerry® from Research in Motion Limited), personal digital assistants (PDAs), global positioning satellite (GPS) units, MP3 players, video players, media players, cameras, camcorders, voice recorder, medical equipment, cash registers and other point-of-sale devices, game consoles (e.g., Xbox 360™ from Microsoft Corporation, PlayStation® 3 from Sony Corporation, Wii™ from Nintendo), remote controls, radios, and many others.

In FIG. 6, the widget is organized using tabs, headers, and subheaders. The tabs include Know 611, Actions 630, and Collaborate 633. Within the Know tab, the headers include Worklist 614, Save Searches 636, Tags 639, Rss Feeds 642, and Hold That Thought 643. Within the Worklist header, the subheaders include Notifications 645, Manager Approvals 648, Awaiting Completion 652, Recently Submitted 655, Awaiting Approvals 658, and Widget Mfg Issues 661. At the bottom window of the widget is search bar 664 with a dialog box 667 where a user can type in search terms.

For each header and subheader, there is a banner indicating a name of the header or subheader (e.g., Worklist, Notifications, Manager Approvals, Save Searches, and so forth). Also, in the banner is a number 670 in parenthesis or brackets that indicates a number of items or entries associated with that particular banner (e.g., header or subheading). For example, Worklist has 21 items which is summation of the number of items in each subheading; Notifications has 5 items; Manager Approvals has 5 items; Awaiting Completion has 3 items; Recently Submitted has 5 items; Awaiting Approvals has 2 items; and Widget Mfg Issues has 1 item.

In a specific implementation a visual indicator is displayed in lieu of or in addition to number 670. The visual indicator is used to indicate whether or not there are any items associated with that particular header, subheader, or both. For example, the visual indicator may be implemented by displaying the header name in bold font if there are items associated with that header and in unbold or normal font if there are no items associated with that header. Thus, FIG. 6 shows the "Worklist" name in bold because there are one or more items for that header.

Other visual indicators may include displaying the name in a different color font such as red to indicate items associated with the header and blue to indicate no items associated with the header. Other examples of visual indicators include the header name in capital letters, italics, underline, animation (e.g., blinking), or combinations of these.

The visual indicator provides another dimension through which the application may communicate information to the user. One benefit of using a visual indicator is that the user can quickly glance at the application screen to find out whether or not there are items.

In a specific implementation, one or more banners may contain additional summary or status information concerning the items that are associated with that particular banner. For example, a banner may include numbers that indicate the number of critical items, unread or unreviewed items, new items, or combinations of these. Critical items may include items that are overdue or are associated with high priority projects. New items may include items that have been added since the user last accessed the application.

Using a keyboard or pointing device such as a mouse, the user selects any tab or any header within the same tab. When a tab is selected, the headers within that tab will be shown. When a header is selected by, for example, clicking a show/hide arrow head 673, the subheaders within the selected header will be shown. A widget may have any number of headers and subheaders (or other items to display), perhaps more than can be shown on one screen or page of the widget window. The user can resize the widget window, but still the number of items to show in the widget window may exceed one page of the window.

Figure 7:
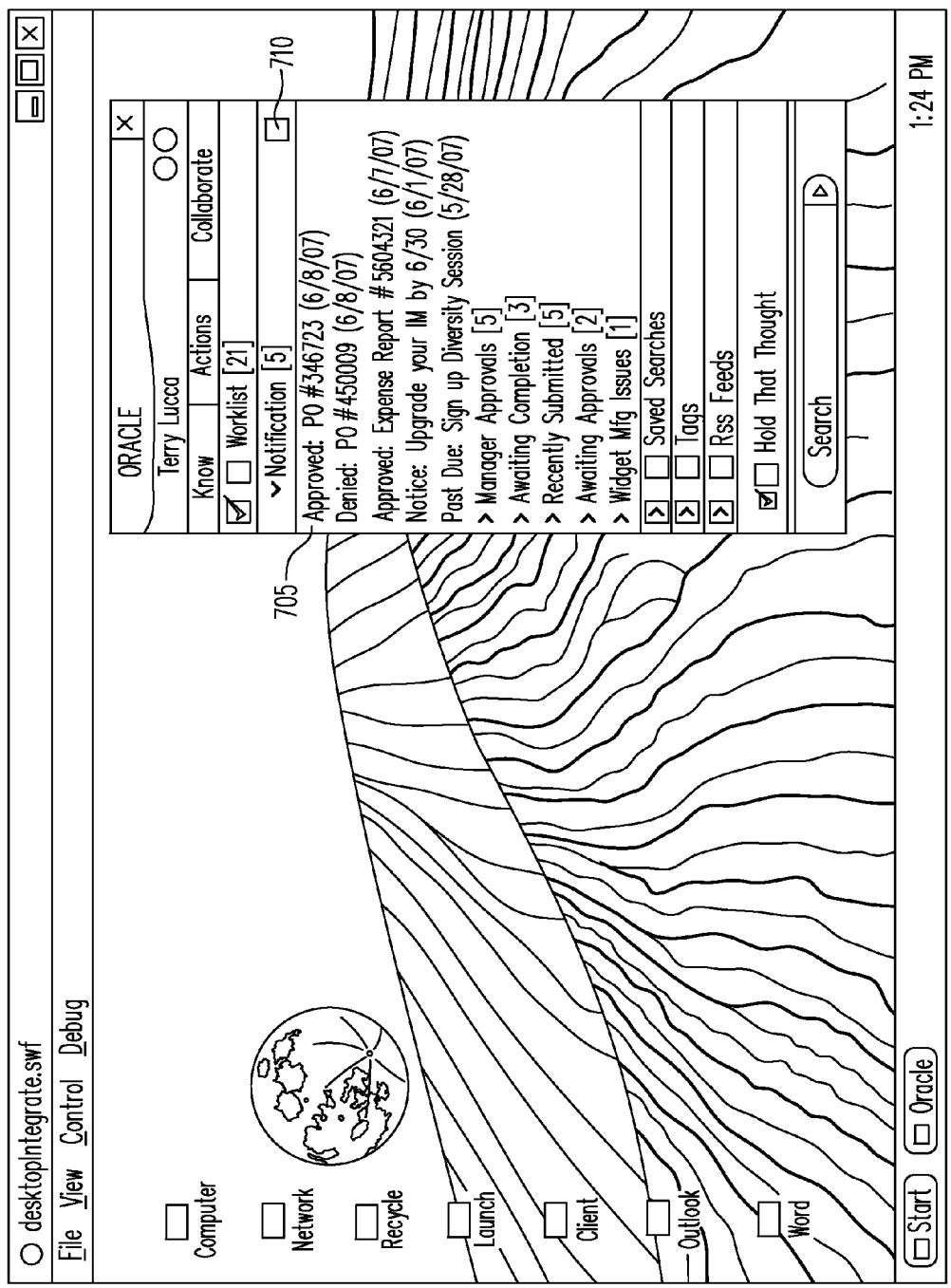
FIG. 7 shows the desktop widget with the Worklist header expanded and the Notification subheader expanded.

FIG. 7 shows the desktop widget with the Worklist header expanded and the Notification subheader expanded in a partially expanded subheader section 705. A user-selectable object 710 is displayed in the widget and associated with the subheader, indicating that toggling of a minimize context and maximize context feature for this subheader is available. In an implementation, the user-selectable object is an icon. This icon may be referred to as a min/max context icon. The user selects the min/max context icon by pointing and clicking the icon. In a specific implementation, a different icon is displayed depending on whether the user is viewing the partially expanded subheader section or the fully expanded subheader section (see FIG. 8). In another implementation, the same icon may be used.

In another implementation, the user-selectable object may be a link with text such as "click to expand" or "click to collapse." In yet another implementation, the user may toggle between the minimize context and maximize context using their keyboard (e.g., pressing a key or combination of keys on their keyboard).

Figure 8:
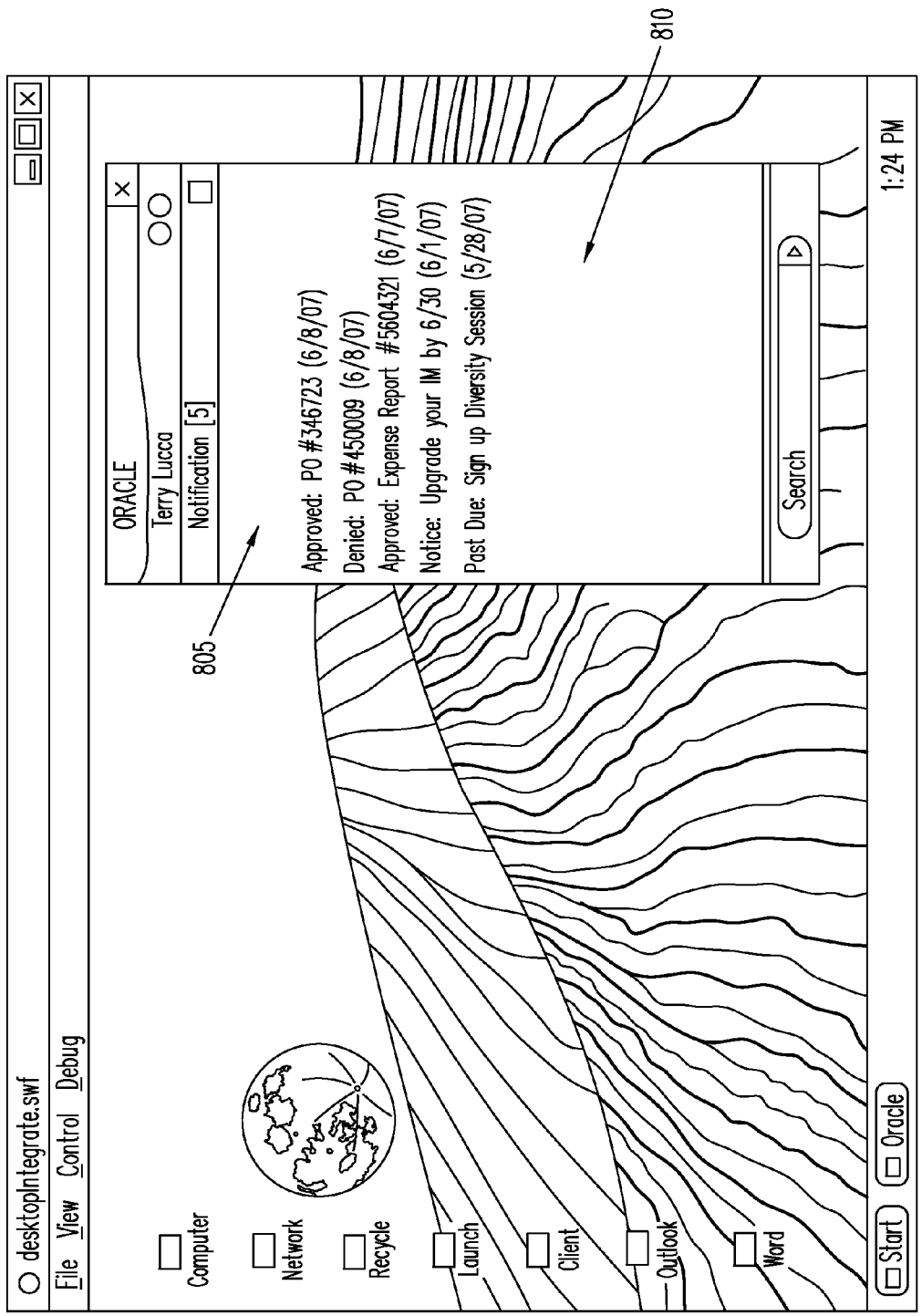
FIG. 8 shows that after clicking an icon, a Notification subheader subregion is expanded to full size, taking up the entire widget window.

FIG. 8 shows that after clicking the icon, a Notification subheader subregion 805 is expanded in a fully expanded subheader section 810, taking up the entire widget window. This allows the user to see more items within the subheader than previously in the widget window layout of FIG. 7. This feature of allows the widget window to show more information to the user without requiring the user to scroll.

In an implementation of the invention, a min/max context icon is associated with each subheader when the subheader is selected and expanded. A similar min/max context icon may be associated with and provide a similar functionality (see further below) for headers and other fields or regions in the desktop widget window.

When the subheader subregion is expanded, other headers, subheaders, and subheader subregions are not visible in the widget window. However, the search bar at the bottom of the window remains. In other implementations, the search bar may also be removed from the window.

Figure 9:
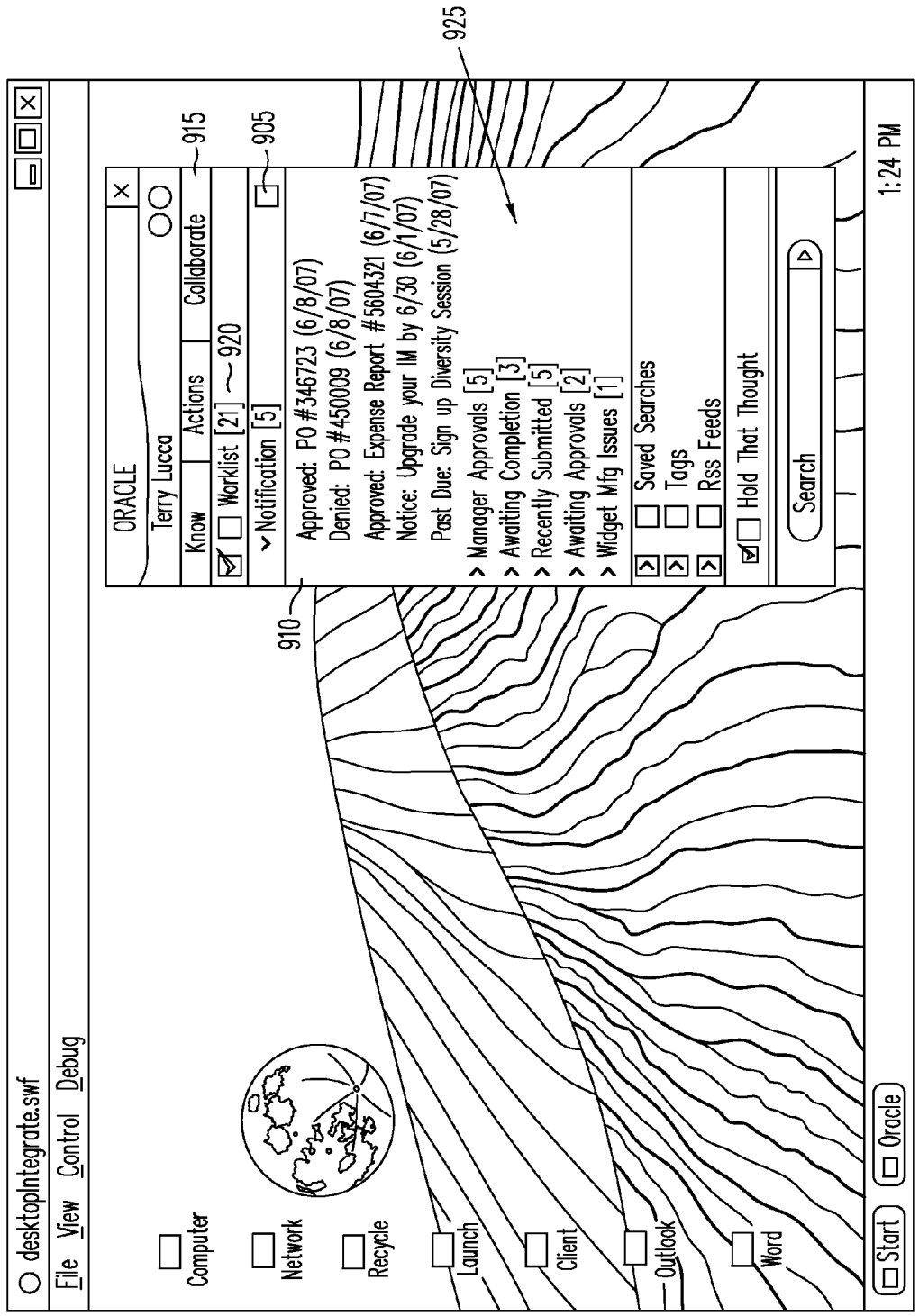
FIG. 9 shows that after clicking the icon again, the Notification subregion is returned to its previous view.

FIG. 9 shows that after clicking icon 905 again, Notification subregion 910 is returned to its previous view. In this layout for the widget window, tabs 915 are in view, headers 920 are in view, and other subheaders 925 are in view. When selected, the icon acts as a toggle between the minimize and maximize view of the particular subheader.

Although the figure shows the tabs at the top of the window, this is not always the case. For example, an implementation may have the tabs at the sides of the window (e.g., left-hand side, or right-hand side). Having the tabs at the sides resembles a paper-based "3-ring binder." Using this metaphor may enhance the usability of the application. In yet another implementation, the tabs may be located at the bottom of the window. Having the tabs at the bottom resembles a paper-based flip chart. Again, using this related metaphor may enhance the usability of the application. Furthermore, a specific implementation may have a combination of tabs on different sides (e.g., left, right, top, and bottom) of the window.

In an implementation, a technique of the invention includes:

(1) Displaying an application window on an electronic screen. For example, the electronic screen may be a computer or mobile phone display, which uses, for example, cathode ray tube (CRT), liquid crystal display (LCD), or organic light-emitting diode (OLED) technology.

Typically, the application takes up only a portion of the screen. In a specific embodiment, the application occupies about 17 percent of the total area of the electronic screen, but the percent can range from about 10 percent to about 50 percent. For example, the application may occupy about 15, 20, 25, 30, 35, 40, 45, or more than 50 percent of the total area of the electronic screen. In other implementations, the percent may be less than 15 percent. This is due, in part, to the large variation in screen sizes. For example, if the user has a large electronic screen then the application may only need to occupy a small percentage of that screen area. However, if the user has a small electronic screen then the application may need to occupy a greater percentage of that screen area in order to show the same amount of information as compared to the large electronic screen.

In some embodiments, the entire screen is used to display the application window, especially when the display is smaller, such as displays on mobile devices, or has less resolution.

Typically, the application is displayed in an application window which has the shape of a rectangle. In a specific implementation, a ratio of the width of the application window to the length of the application window is approximately 1.9. In another implementation, a ratio of the width of the application window to the length of the application window is approximately 2.8. However, the ratio may range from about 1.5 to about 3.5. The ratio may be 1.6 (i.e., the golden ratio), 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or more than 3.5. Depending on the application, the ratio may be 1 where, for example, the application window has the shape of a square.

A specific implementation may include a large number of items having short descriptions. Thus, a narrower window, i.e., a larger width-to-length ratio, is more appropriate because it allows a user to see more items as opposed to a wider window, i.e., a smaller width-to-length ratio.

Conversely, another implementation may include a small number of items having long descriptions. Thus, a wider window, i.e., a smaller width-to-length ratio, is more appropriate because it allows a user to see a complete description of the items without having the items wrap or requiring the user to horizontally scroll.

(2) Displaying within the application window, an expanded header section including at least first and second collapsed (or unexpanded) subheader sections. Each collapsed subheader section includes a banner indicating of a number of items associated with each subheader section.

(3) When a user selects the collapsed first subheader section using a pointing device (e.g., pointing and clicking on the subheader section itself), displaying an expanded first subheader section in a first region of the application window having a first area size and the collapsed second subheader section. The expanded first subheader section includes items associated with the first subheader section. A first banner for the expanded first subheader section includes an icon.

(4) When the user selects the icon using the pointing device (e.g., pointing and clicking on the icon), displaying the items associated with the first subheader section in a second region of the application window having a second area size, larger than the first area size. The collapsed second subheader section is not displayed in the application window.

Since the second region has a larger viewing area than the first region, more items are viewable in the second region than in the first. For example, if there are more items than can be shown in the first region, then the user may use scroll bars to scroll up and down through the listing of items. If there are too many items to display in the first region, only a portion or partial view of the items may be available, without scrolling.

When viewing using the second region, the user may not have to scroll because there is enough screen area to list all the items; however, if there are too many items even for the second region area, then scroll bars may be used for the second region as well.

A specific implementation of the application may also include horizontal scroll bars in the first region, second region, or both. For example, an item may be too long to display in the application window. Thus, the horizontal scroll bar allows the user to scroll horizontally in order to see the item. In another implementation, the application automatically wraps the text, such as the text of an item, to the next line if the item is too long to display in the application window. This helps to address an issue with certain users who may find horizontal scrolling to be awkward.

(5) When the user selects the icon again, the display within the application returns to the view in step 3 above. The icon acts as a toggle.

In the implementation shown in the figures, the search bar is a fixed element that remains in the application window, before and after the icon is clicked. In another embodiment of the invention, the search bar is removed after the icon is clicked (and the second region is displayed) to give even more area for displaying items in the second region.

As discussed above, the invention has been shown implemented in a widget application, but the invention is also applicable to other software applications, such as by using side panes of other software applications.

Figure 10:
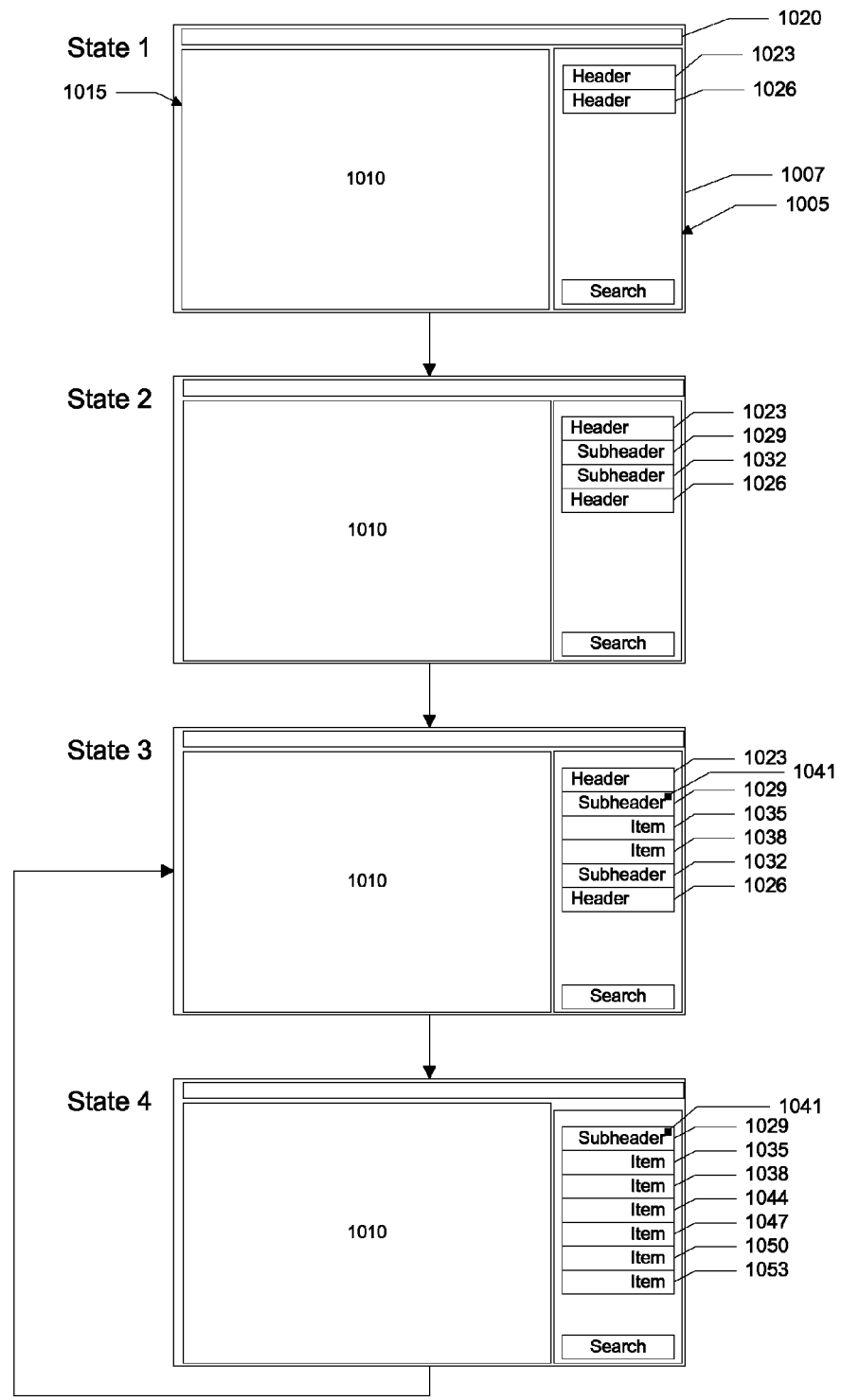
FIG. 10 shows an example of various system states of a second implementation of the invention running in a side pane.

FIG. 10 shows an example of various system states of a second implementation of the invention running in a side pane. In a state 1, an application 1005 is running in a side pane 1007 adjacent to a workspace 1010 of another application 1015. In a specific implementation, application 1005 does not overlap or otherwise encroach upon the workspace and instead abuts the workspace. Application 1015, in addition to the workspace, may also include a toolbar 1020.

The workspace may contain a work such as a word processing document, a spreadsheet workbook, a database page, a drawing page, a photo-editing canvas, a calendar, an e-mail, a presentation slide, and the like.

The toolbar may be located above the workspace and application 1005. The toolbar may include commands that the user selects to perform actions on the work in the workspace. Examples of commands include opening a new file, saving a file, copy, paste, print, spell check, find, and the like. The commands may be implemented as, for example, buttons, links, or drop down menus.

In a state 2, the user has selected a header 1023. A header 1026 drops down in the side pane so that subheaders 1029 and 1032 are shown.

In a state 3, the user has selected subheader 1029. Subheader 1032 and header 1026 further drop down in the side pane so that some or all items associated with subheader 1029 can be viewed. In the example shown in FIG. 10, items 1035 and 1038 which are associated with subheader 1029 are shown. A user-selectable object 1041 is also shown with subheader 1029.

In a state 4, the user has clicked on the user-selectable object. The side pane now displays additional items such as items 1044, 1047, 1050, and 1053 that are associated with subheader 1029. The headers and subheader 1032 are not shown to ensure efficient use of the area provided in the side pane. When the user toggles or clicks the user-selectable object again, the side pane returns to the display in state 3.

In a specific implementation, the user may jump from state 2 to state 4 and back to state 2 without having to encounter state 3. For example, in state 2, the subheader may include a user-selectable object that toggles the display between state 2 and state 4.

In a specific implementation, the side pane does not overlap or otherwise cover any portion of the workspace as the user progresses through the various states of the side pane. Furthermore, no additional window pops up that obstructs the workspace. Thus, the user may perform any number of actions within the side pane without having any portion of their workspace hidden by, for example, a pop-up window.

This has several benefits. For example, eliminating a pop-up window saves the user the step of having to either move the pop-up window around in order to see their whole workspace, or resize their workspace so that the pop-up window is not floating over their workspace. The user can remain focused on the work in their workspace.

Figure 11:
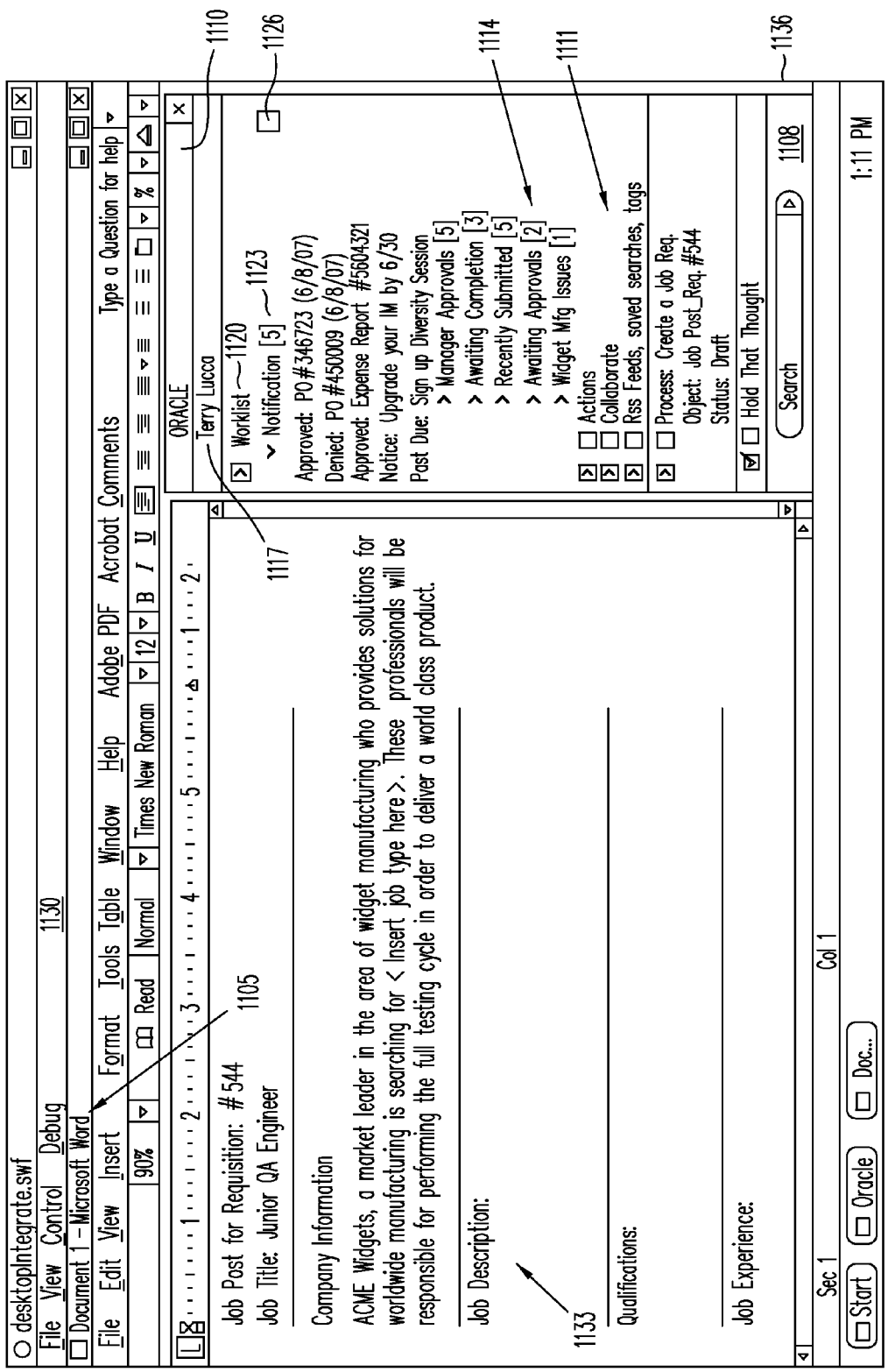
FIG. 11 shows a productivity application with an application running in a side pane.
Figure 12:
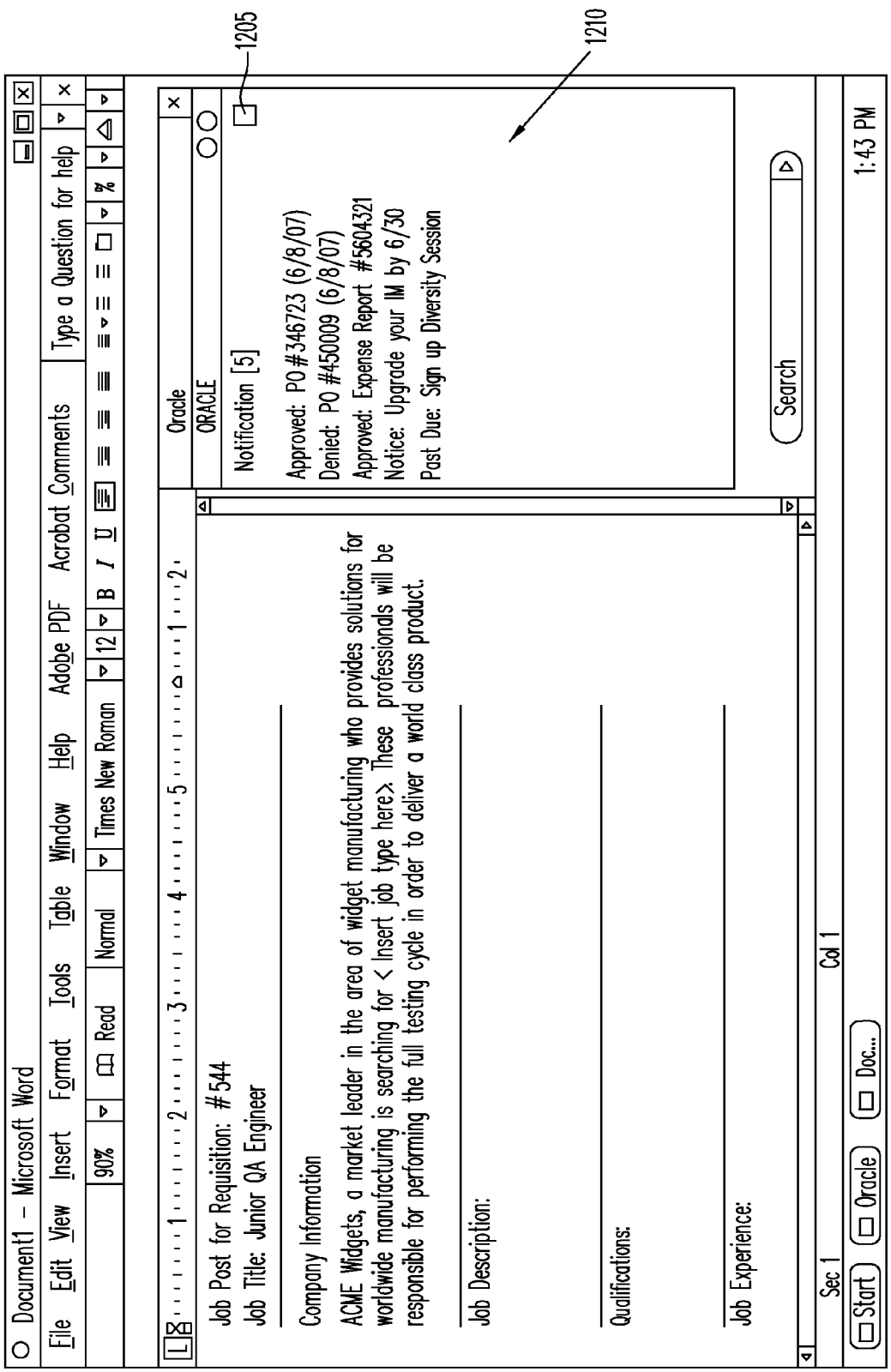
FIG. 12 shows that after clicking the icon, a Notification subheader subregion is expanded to full size, taking up the entire side pane window.
Figure 13:
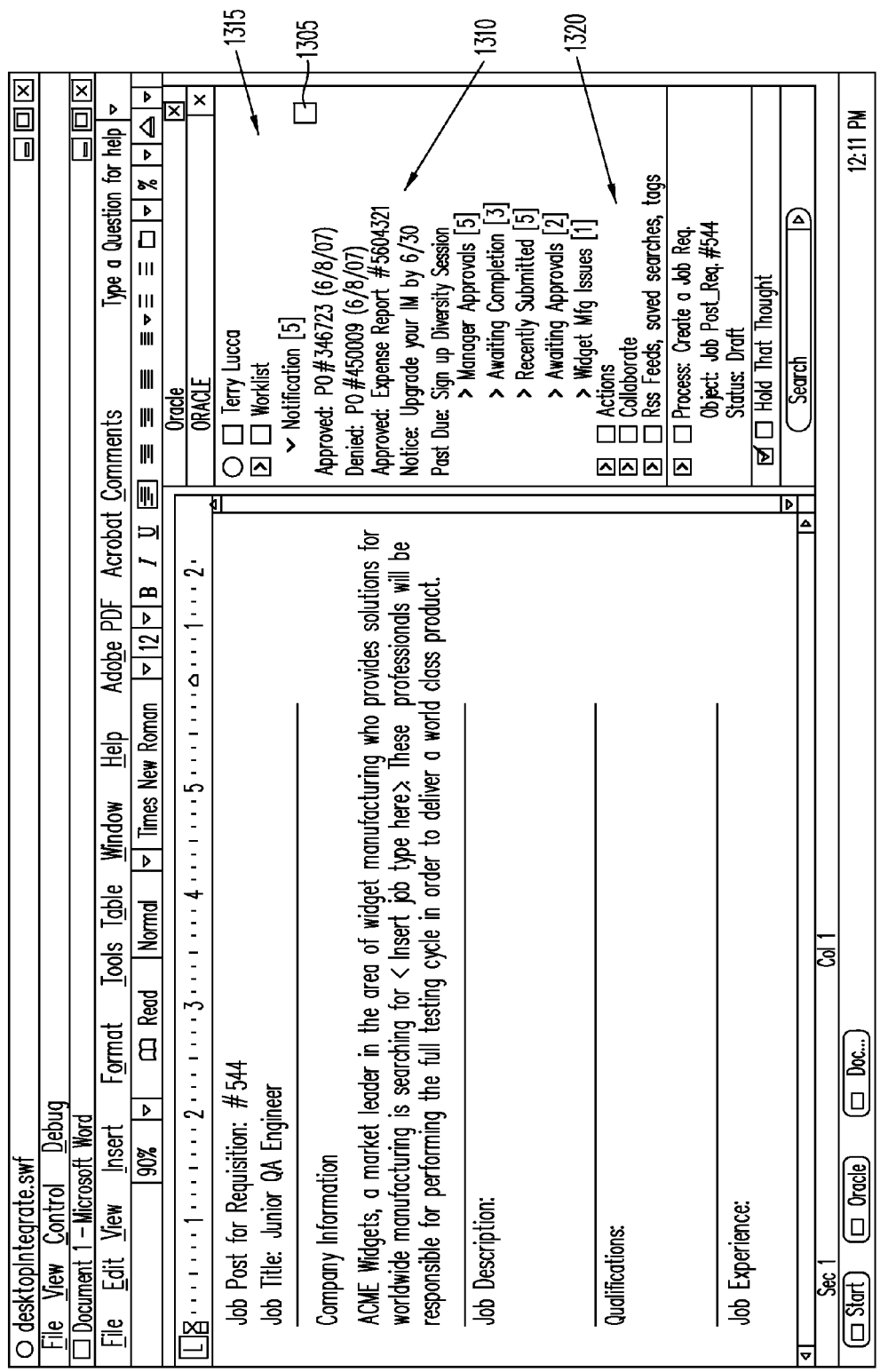
FIG. 13 shows that after clicking the icon again, the Notification subregion is returned to its previous view.

FIGS. 11-13 show screens of the invention when applied to the side pane of a word processing application.

FIG. 11 shows a productivity application 1105 (e.g., Microsoft Word) with an application 1110 (e.g., Oracle Application Side Pane) running in a side pane 1108. This side pane has headers 1111 and subheaders 1114 analogous to the widget application described above. Although this implementation does not include the tabs described in the widget application above, another implementation may include the tabs. In this figure, a global area 1117 of "Terry Luca" is expanded, a Worklist header 1120 is expanded, and a Notification subheader 1123 is expanded. An icon 1126 indicates a minimize context/maximize context feature is available for the particular subheader the icon is associated with.

The side pane is adjacent to and does not overlap with a main application window 1130, which in this example, has a workspace or an editing screen 1133 of the word processing program. The side pane may be referred to as being docked with or attached to the main application window. In the figure, the side pane is attached to a left edge 1136 of the main application window. In other implementations, the side pane may be attached and not overlap with any edge (e.g., top, bottom, right, or left) of the application window. In an implementation, the side pane may be undocked or detached from the main window and moved to any position the user desires. The detached side pane may be moved so that it overlaps with the main window.

FIG. 12 shows that after clicking an icon 1205, a Notification subheader subregion 1210 is expanded to full size, taking up the entire side pane window. This allows the user to see more items within the subheader than previously in the side pane window layout of FIG. 11. This feature of the invention allows the side pane window to show more information to the user whenever the user desires to do so without the user having to scroll.

FIG. 13 shows that after clicking an icon 1305 again, a Notification subregion 1310 is returned to its previous view. In this layout for the side pane window, headers 1315 are in view and subheaders 1320 are in view. When selected, the icon acts as a toggle between the minimize and maximize view of the particular subheader.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
    displaying a first application window on an electronic screen;
    displaying within the first application window, a plurality of tabs; displaying within a tab, a plurality of header sections including an expanded header section comprising at least first and second subheader sections collapsed;
    wherein the collapsed first subheader section includes a first banner;
    when the first subheader section has one or more first items, displaying a visual indicator in the first banner;
    in response to the collapsed first subheader section being selected by a pointing device, displaying within said tab in the first application window, said first subheader section partially expanded in a first region to have a first area size for showing at least a subset of the one or more first items of the first subheader section, and the collapsed second subheader section;
    wherein the first subheader section on being displayed partially expanded comprises the subset of the first items displayed associated with the first subheader section; and
    wherein a second banner for the first subheader section displayed partially expanded further comprises a user-selectable object;
    when the partially expanded first subheader section has additional first items to display, displaying the visual indicator in the second banner; and
    in response to the user-selectable object in the second banner being selected by the pointing device, displaying in the first application window at least the first subheader section and associated therewith the subset of the first items and the additional first items while automatically omitting from the first application window at least the plurality of header sections and the plurality of tabs, so that a second region in which the subset of the first items and the additional first items are displayed in the first application window is automatically increased from the first area size of the first region to an area size of the first application window obtained by not showing at least the plurality of header sections and the plurality of tabs;
    wherein the first application window has an area that is constant during said displayings.

2. The method of claim 1 wherein more items are viewable in the second region of the first application window than in the first region.

3. The method of claim 1 wherein after displaying the additional first items associated with the first subheader section in the second region of the first application window:
    in response to selection of the user-selectable object by use of the pointing device, displaying the plurality of tabs, the plurality of header sections, the expanded first subheader section and the collapsed second subheader section;
    wherein the expanded first subheader section comprises the first items displayed associated with the first subheader section without the additional first items displayed; and
    wherein the second banner for the expanded first subheader section comprises the user-selectable object.

4. The method of claim 1 wherein when displaying the expanded first subheader section, the first items are displayed in first region of the first application window beneath the first banner.

5. The method of claim 1 wherein:
    a search bar to receive user input of search terms is displayed in the first application window before and after receiving a selection of the user-selectable object; and
    the collapsed second subheader section includes a third banner and the third banner is not displayed when the additional first items associated with the first subheader section are displayed in the second region.

6. The method of claim 1 wherein the visual indicator is a counter for indicating a number of first items associated with the first subheader section.

7. The method of claim 1 wherein the user-selectable object is an icon.

8. The method of claim 1 wherein when displaying the first items associated with the first subheader section in the second region of the first application window, the first items are demarcated by an indentation.

9. The method of claim 1 further comprising the step of displaying the first application window within a second application window in the plurality of windows.

10. The method of claim 9 wherein when displaying the first application window within the second application window, the first application window is displayed in a side pane.

11. The method of claim 9 wherein when displaying the first application window within the second application window, the first application window abuts a workspace of the second application window.

12. The method of claim 3 further comprising the step of displaying the first application window within a second application window in the plurality of windows, wherein the first application window abuts a workspace of the second application window.

13. The method of claim 10 wherein the second application window comprises a database application.

14. A non-transitory computer-readable medium comprising:
    instructions to one or more processors to display an application window;
    instructions to the one or more processors to display within the application window, a plurality of tabs;

instructions to the one or more processors to display within a tab, a plurality of header sections including at least a collapsed header section;

wherein the collapsed header section comprises a header banner;

instructions, responsive to the collapsed header section being selected, to one or more processors to display an expanded header section in the application window, wherein the expanded header section comprises at least a collapsed first sub header section;

instructions, responsive to the collapsed first sub header section being selected, to one or more processors to display said first sub header section partially expanded to have a first area size in the application window, wherein the partially expanded first subheader section comprises a first user-selectable object and a subset of first items displayed associated with the first subheader section; and instructions, responsive to the first user-selectable object in said first sub header section being selected, to one or more processors to display in the application window at least said first sub header section and associated therewith the subset of the first items and additional first items displaying while automatically omitting from the first application window at least the plurality of header sections and the plurality of tabs, so that second region in which the subset of the first items and the additional first items can be displayed in the application window is automatically increased from the first area size of the first region to an area size of the first application window obtained by not showing at least the plurality of header sections and the plurality of tabs;

wherein the application window has an area that is constant during execution of the instructions to display.

15. The non-transitory computer-readable medium of claim 14 wherein the collapsed header section is hereinafter collapsed first header section, and wherein the instructions to display within the application window comprise instructions to display a collapsed second header section.

16. The non-transitory computer-readable medium of claim 15 wherein the instructions to display said first sub header section omit display of the collapsed second header section.

17. The non-transitory computer-readable medium of claim 14 wherein more items are viewable with the fully expanded subheader section than using the partially expanded subheader section.

18. The non-transitory computer-readable medium of claim 14 wherein the header banner further comprises a counter indicating a number of first items associated with the first sub header section.

19. The non-transitory computer-readable medium of claim 14 wherein the first sub header section further comprises a subheader banner wherein the subheader banner comprises a subcounter indicating a number of first items associated with the first sub header section.

20. A computer system comprising:
means for displaying a first application window on an electronic screen;
means for displaying within the first application window, a plurality of tabs;
means for displaying within a tab, a plurality of header sections including an expanded header section comprising at least first and second subheader sections collapsed;
wherein the collapsed first subheader section includes a first banner;
when the first subheader section has one or more first items, displaying a visual indicator in the first banner;
means, responsive to the collapsed first subheader section being selected by a pointing device, for displaying within said tab in the first application window, said first subheader section partially expanded in a first region to have a first area size for showing at least a subset of the one or more first items of the first subheader section, and the collapsed second subheader section;
wherein the first subheader section on being displayed partially expanded comprises the subset of the first items displayed associated with the first subheader section; and
wherein a second banner for the first subheader section displayed partially expanded further comprises a user-selectable object;
when the partially expanded first subheader section has additional first items to display, displaying the visual indicator in the second banner; and
means, responsive to the user-selectable object in the second banner being selected by the pointing device, for displaying in the first application window at least the first subheader section and associated therewith the subset of the first items and the additional first items while automatically omitting from the first application window at least the plurality of header sections and the plurality of tabs, so that a second region in which the subset of the first items and the additional first items are displayed in the first application window is automatically increased from the first area size of the first region to an area size of the first application window obtained by not showing at least the plurality of header sections and the plurality of tabs;
wherein the first application window has an area that is constant.

* * * * *

UNITED STATES PATENT AND TRADEMARK OFFICE
CERTIFICATE OF CORRECTION

PATENT NO. : 8,504,938 B2  
APPLICATION NO. : 12/174489  
DATED : August 6, 2013  
INVENTOR(S) : Vaughan et al.

Page 1 of 1

It is certified that error appears in the above-identified patent and that said Letters Patent is hereby corrected as shown below:

In the Claims

In column 17, line 25, in Claim 14, before "while" delete "displaying".

Signed and Sealed this
Nineteenth Day of November, 2013

Teresa Stanek Rea
*Deputy Director of the United States Patent and Trademark Office*